United States Patent
Íñiguez

(10) Patent No.: US 9,146,777 B2
(45) Date of Patent: *Sep. 29, 2015

(54) PARALLEL PROCESSING WITH SOLIDARITY CELLS BY PROACTIVELY RETRIEVING FROM A TASK POOL A MATCHING TASK FOR THE SOLIDARITY CELL TO PROCESS

(71) Applicant: Alfonso Íñiguez, Mesa, AZ (US)

(72) Inventor: Alfonso Íñiguez, Mesa, AZ (US)

(73) Assignee: Swarm Technology LLC, Mesa, AZ (US)

( * ) Notice: Subject to any disclaimer, the term of this patent is extended or adjusted under 35 U.S.C. 154(b) by 347 days.

This patent is subject to a terminal disclaimer.

(21) Appl. No.: 13/750,696

(22) Filed: Jan. 25, 2013

(65) Prior Publication Data

US 2014/0215470 A1 Jul. 31, 2014

(51) Int. Cl.
G06F 9/46 (2006.01)
G06F 9/48 (2006.01)
G06F 9/54 (2006.01)
G06F 9/50 (2006.01)

(52) U.S. Cl.
CPC ............ *G06F 9/4843* (2013.01); *G06F 9/5044* (2013.01); *G06F 9/54* (2013.01); *G06F 9/544* (2013.01); *G06F 2209/5017* (2013.01)

(58) Field of Classification Search
CPC .......... G06F 12/0862; G06F 2212/251; G06F 9/3885; G06F 9/5033; H04W 4/005
See application file for complete search history.

(56) References Cited

U.S. PATENT DOCUMENTS

| | | | |
|---|---|---|---|
| 6,330,583 B1 | 12/2001 | Reiffin | |
| 7,082,604 B2 | 7/2006 | Schneiderman | |
| 7,159,215 B2 | 1/2007 | Shavit et al. | |
| 7,174,381 B2 | 2/2007 | Gulko et al. | |
| 8,209,702 B1 | 6/2012 | Roytman et al. | |
| 8,284,206 B2 | 10/2012 | State | |
| 8,533,729 B2 | 9/2013 | Yao | |
| 8,732,713 B2 | 5/2014 | Coon et al. | |
| 2005/0188372 A1* | 8/2005 | Inoue et al. | 718/100 |
| 2006/0026377 A1* | 2/2006 | Sikdar et al. | 711/170 |
| 2007/0074207 A1* | 3/2007 | Bates et al. | 718/1 |

* cited by examiner

*Primary Examiner* — Meng An
*Assistant Examiner* — Wissam Rashid
(74) *Attorney, Agent, or Firm* — Michael K. Kelly; Jennings, Strouss & Salmon PLC

(57) ABSTRACT

A method and apparatus for processing information in parallel uses autonomous computer processing cells to perform tasks needed by a central processing unit. Each cell in the system is connected through a switching fabric, which facilitates connections for data transfer and arbitration between all system resources. A cell has an agent, which is a software module that may be transferred through the switching fabric to a task pool containing the tasks. The agent searches within the task pool for available tasks that match the cell's instruction type. A task may be broken into threads that are to be executed sequentially or independently depending on recipes constructed by the central processing unit. Interdependent tasks within the task pool may be logically combined as needed by the recipe. A notification is sent from the task pool to the central processing unit when a task or task thread is completed.

14 Claims, 2 Drawing Sheets

PARALLEL PROCESSING WITH SOLIDARITY CELLS BY PROACTIVELY RETRIEVING FROM A TASK POOL A MATCHING TASK FOR THE SOLIDARITY CELL TO PROCESS

FIELD OF INVENTION

This invention relates to parallel-process computing. This invention relates particularly to a method and apparatus that facilitates parallel processing of computing tasks using autonomous co-processors that proactively seek tasks to perform.

BACKGROUND

Parallel processing is a computational approach that breaks a large computational requirement into a group of smaller computations for concurrent resolution across the computer's processing resources. A computer that uses task parallelism divides the large requirement into tasks that contain segments of executable code. The tasks are then executed concurrently or sequentially according to their needs, until the large requirement has been fully processed. In a multiprocessor system, the computer includes a central processing unit ("CPU") that is tasked with performing the large requirement. The CPU divides the requirement into tasks and distributes the tasks to co-processors. Completed threads are reported to the CPU, which continues to distribute threads until the primary processing is complete.

This typical multiprocessing framework suffers from two major drawbacks, both caused by the architectural requirement that the CPU divide and distribute the threads. First, a significant amount of the CPU's processing time is consumed in managing the co-processing tasks. The management may include: distributing the tasks, in sequential order when needed, to co-processors according to their capabilities; waiting for tasks to be completed before distributing result-dependent threads; responding to interrupts from co-processors every time a task is completed; and responding to other messages from co-processors. Second, a co-processor will remain idle as it waits for a thread to be assigned to it by the CPU. A multiprocessor system that alleviates the management workload on the CPU while keeping the co-processors busy is needed.

Therefore, it is an object of this invention to provide an apparatus and method for parallel processing in a multiprocessor system using co-processors that proactively seek threads to process. It is a further object that the co-processors be capable of acting autonomously. It is a further object that the co-processors include an agent that searches a task pool to acquire tasks for the co-processors to perform. It is a further object that the co-processors work in solidarity to complete a large computational requirement by processing threads and subtasks.

SUMMARY OF THE INVENTION

A method and apparatus for processing information in parallel uses autonomous computer processing units, referred to herein as solidarity cells, to process instructions intended to be executed by a central processing unit ("CPU"). A solidarity cell may be a general- or special-purpose processor, and therefore may have the same or different instruction set architecture and microarchitecture compared to the CPU and other solidarity cells in the apparatus. As with any computer system, the information to be processed is contained within one or more memory units. The CPU divides the information into one or more tasks. A task may include task threads, which each contain one or more subtasks to be performed. The CPU transmits the tasks to a task pool. Each solidarity cell in the system is connected, physically or wirelessly, to the task pool through a switching fabric. The switching fabric facilitates connections for data transfer and arbitration between all system resources. Each solidarity cell is proactive, in that it obtains a task to perform by sending its agent to the task pool when the solidarity cell has no processing to perform. The agent is a software module that searches the task pool for available tasks that match the cell's instruction set architecture. The solidarity cells may execute the task threads sequentially or in parallel, and independently or collaboratively, depending on recipes provided by the CPU. Interdependent tasks within the task pool may be logically combined as needed by the recipe. The task pool notifies the CPU when a task thread is completed.

DETAILED DESCRIPTION OF THE INVENTION

Figure 1:
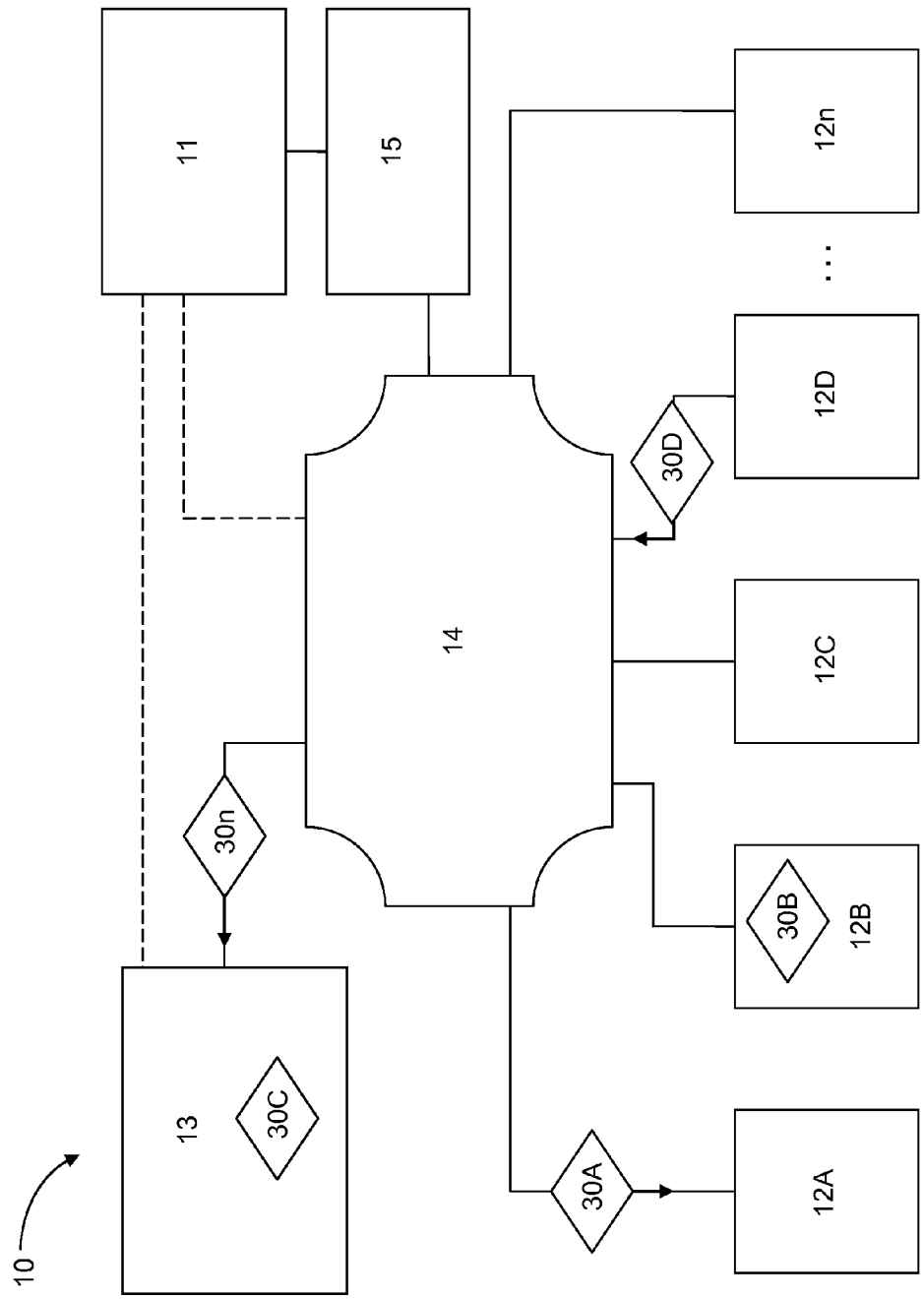
FIG. 1 is a diagram of the preferred embodiment of the present inventive apparatus.

Referring to FIG. 1, there is illustrated the preferred embodiment of a parallel processing system 10 for performing computing tasks, such as data-intensive computations and complex programs and algorithms. Examples of data-intensive computations include, without limitation: data encryption functions; graphic processing; direct memory access; mathematical computations; ethernet packet processing, including construction, reception and transmission of data to the outside world; processes within search engines and other web applications; and execution of internal or external software programs. The system 10 may be implemented in any present or later-developed computer architecture, with the below-described inventive aspects incorporated into or supplemented by parallel processing strategies and solutions currently known in the art. For example, common parallel processing concerns such as synchronization, cache coherency, and main processor interrupts may be adequately addressed as is known in the art without compromise to the inventive system 10. The system 10 has at least one CPU 11 and one or more solidarity cells 12A, B, C, D . . . n, hereinafter referred to collectively as solidarity cells 12A . . . n to indicate that the system 10 may have any number n of solidarity cells, that cooperate to perform the computing tasks ascribed to the system 10. The solidarity cells 12A . . . n communicate with a task pool 13, preferably through a switching fabric 14. The solidarity cells 12A . . . n may further communicate with each other through the switching fabric 14 or through a separate cell bus (not shown). The CPU 11 may communicate with the task pool 13 directly or through the switching fabric 14 as shown. One or more memory units 15 contain data and instructions to perform computations. The memory units 15 may be connected to the switching fabric 14 so they may be accessed by the CPU 11 and solidarity cells 12A . . . n. The CPU 11 may access the memory units 15 directly, without going through the switching fabric 14.

The CPU 11 may be any CPU conventionally used to satisfy the computing needs of the environment in which the system 10 is implemented. That is, the system 10 may be implemented on a personal computer, in which case the CPU 11 may be any personal computer central processor or processor cluster, such as an Intel® Pentium® or multi-core processor. Or, the system 10 may be implemented on a supercomputer and the CPU 11 may be a reduced instruction set computer ("RISC") processor or a microcontroller. Or, the system 10 may be implemented on a locally connected series of personal computers, such as a Beowulf cluster, in which case the CPU 11 may include the central processors of all, a subset, or one of the networked computers. Or, the system 10 may be implemented on a network of remotely connected computers, in which case the CPU 11 may be now known or later developed central processor for a server or mainframe. The ability of the CPU 11 to perform the inventive parallel processing methods within the presently described system 10 depends on the CPU's 11 operating system. Specifically, the CPU 11 is a suitable CPU for the system 10 if its operating system may be programmed to recognize and communicate with the task pool 13 and divide computing requirements into threads as described below. The system 10 implementations described herein are therefore not limiting. In fact, it is contemplated that the system 10 may be implemented, even retroactively, on any computer or computer network having an operating system that may be modified to perform the described functions. As is known in the art, the information to be processed is contained within the memory units 15, which may be addressed regions of random access or read-only memory, cache memory for the CPU 11, or other forms of data storage such as flash memory and magnetic storage. The memory units 15 contain the data to be processed as well as the location to place the results of the processed data.

A solidarity cell 12A ... n is an independent computational unit capable of executing one or more tasks. The solidarity cell 12A ... n may be a microcontroller, a microprocessor, or a standalone computer such as a machine in a Beowulf cluster. Preferably, the solidarity cell 12A ... n is a general- or special-purpose coprocessor configured to supplement the functions of the CPU 11. A general-purpose coprocessor may be capable of performing all of the functions of the CPU 11, and may perform all of the functions or a limited range of functions as needed by the architecture of the system 10. A special-purpose processor may be a dedicated hardware module designed to perform a specialized task, or it may be a general-purpose processor configured to perform specialized tasks such as graphics processing, floating-point arithmetic, or data encryption. In the preferred embodiment, any solidarity cell 12A ... n that is a special-purpose processor is also configured to access and write to memory and execute descriptors, as described below, as well as other software programs. Most preferably, there is a plurality of solidarity cells 12A ... n, and there may be any number of solidarity cells 12A ... n, that creates a heterogeneous computing environment populated by different types of specialized co-processors that may not be directly compatible, such as if the co-processors have differing instruction set architectures, but are utilized by the system 10 to most efficiently process the large requirement.

Each cell 12A ... n is capable of performing one or a set of specialized tasks. The system 10 may include a plurality of cells capable of performing the same tasks, to create redundancy in the system 10. The set of tasks performed by a given cell 12A ... n may be a subset of the set of tasks performed by another cell in the system. For example, in FIG. 1, the system 10 divides a computing problem into tasks of a first type, a second type, and a third type; a first cell 12A is capable of performing only tasks of the first type; a second cell 12B can perform tasks of the second type; a third cell 12C can perform tasks of the third type; a fourth cell 12D can perform tasks of the second or third types; and a fifth cell 12N can perform all three task types. The system 10 may be configured with this redundancy so that if a given cell is removed from the system 10, the system 10 will continue to function seamlessly. Furthermore, if a given cell is dynamically added to the system 10, then the system 10 will continue to functions seamlessly with the benefit of increased performance, assuming that the added cell is capable of performing task types in the system 10. The cells 12A ... n are capable of autonomously fetching, moving, and processing data contained in the memory units 15.

Figure 2:
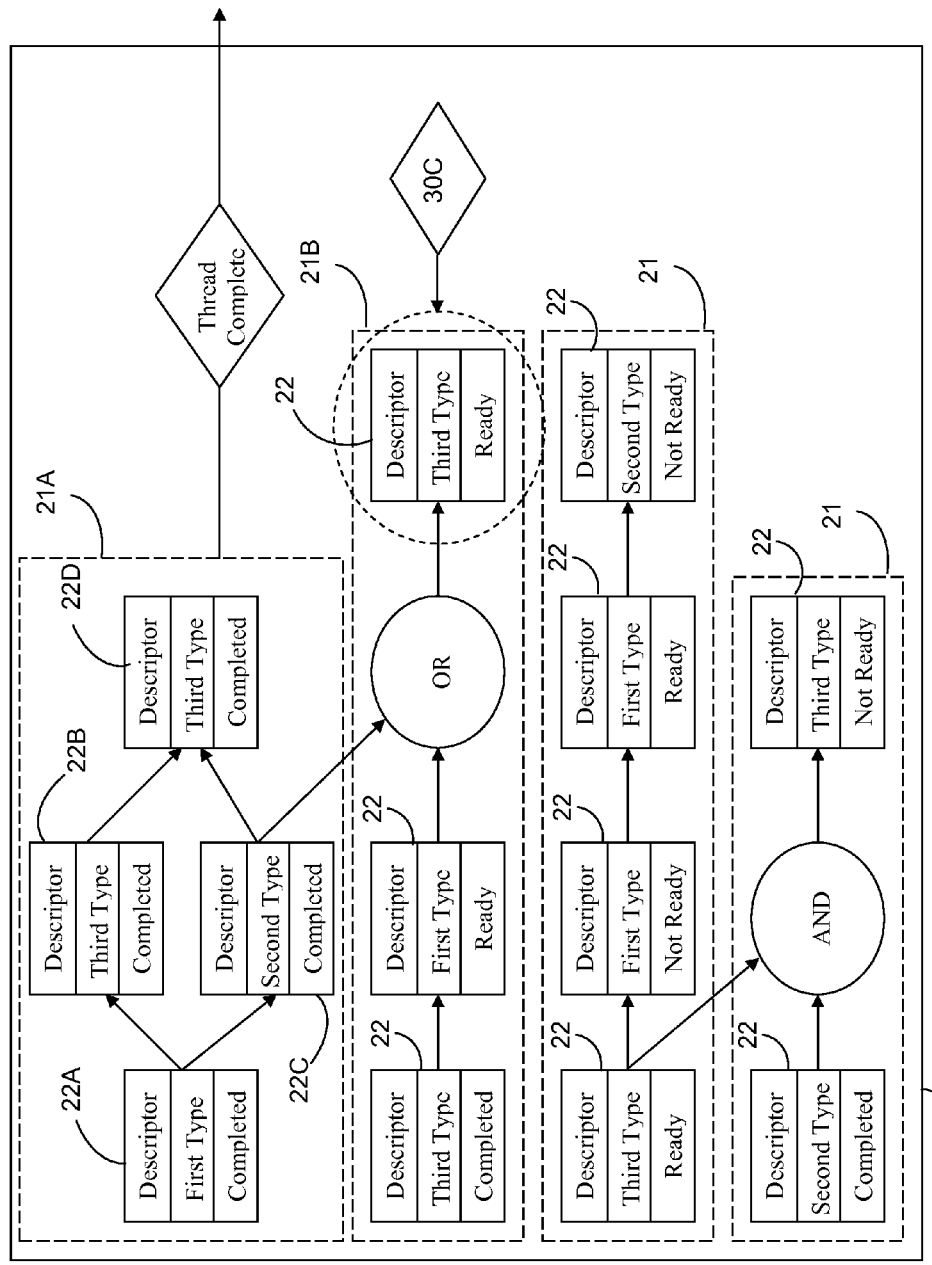
FIG. 2 is a diagram of a task pool implemented according to the preferred embodiment of the invention.

Referring to FIGS. 1 and 2, the task pool 13 preferably occupies a region of physical memory that is addressable by the CPU 11. Preferably, the task pool 13 is also addressable by the cells 12A ... n. Preferably, the task pool 13 is disposed in a dedicated hardware block to provide maximum access speed by the CPU 11 and cells 12A ... n. Alternatively, the task pool 13 may be software based. In this embodiment, the contents of the task pool 13 are stored in memory, as in the hardware-based embodiment, but are represented by data structures. The task pool 13 contains one or more task threads 21. A task thread 21 represents a computational task that a component of the larger requirement imposed on the CPU 11. In one embodiment, the CPU 11 may initialize and then populate the task pool 13 by dividing the large requirement into concurrently executable threads 21 and places the threads 21 in the task pool 13. A thread 21 is composed of one or more tasks 22. A task 22 may have a task type and a descriptor. The task type is an indicator that describes which solidarity cells 12A ... n are capable of performing the task 22. The task pool 13 may also use the task type to prioritize tasks 22 having the same type. In one embodiment, which may be advantageous for a large-scale system 10, the task pool 13 may maintain a prioritization table (not shown) that documents the solidarity cells 12A ... n present in the system 10, the types of tasks 22 each is capable of performing, and whether or not each cell 12A ... n is presently processing a task 22. The task pool 13 may use the prioritization table to determine which of the eligible tasks 22 to assign to a requesting cell 12A ... n as described below.

The descriptor may contain one or more of a specific instruction to be executed, a mode of execution, the location of the data to be processed, and the location for placement of the results, if any. The location for placement of results is optional, such as in the case of animation and multimedia tasks that simply present results to a display rather than storing them in memory units 15. Task 22 descriptors may be chained together, as in a linked list, so that the data to be processed may be accessed with fewer memory calls than if the descriptors were not chained together. In the preferred embodiment, the descriptor is a data structure containing a header and a plurality of reference pointers to memory locations, and the task 22 includes the memory address of the data structure. The header defines the function or instruction to execute. A first pointer references the location of the data to be processed. A second, optional pointer references the location for placement of processed data. If the descriptor is linked to another descriptor to be sequentially executed, the descriptor includes a third pointer that references the next descriptor. In an alternative embodiment where the descriptor is a data structure, the task 22 may include the full data structure.

A thread 21 may further comprise a "recipe" describing the order in which the tasks 22 should be performed and any conditions that affect the order of performance. According to the recipe, the tasks 22 may be executed sequentially, concurrently, interdependently, or conditionally according to Boolean operations. For example, in FIG. 2 thread 21A comprises four tasks: a first task 22A must be completed before a second task 22B and a third task 22C can begin; according to the recipe, once either the second task 22B or third task 22C is complete, the fourth task 22D may begin. Threads 21 may also be interdependent. For example, in FIG. 2, due to the Boolean operation in thread 21B, a completed task 22C may allow processing of tasks in thread 21B to continue. The task pool 13 may lock a task 22 while the task 22 is waiting for completion of another task 22 on which it depends. When a task 22 is locked, it cannot be acquired by a solidarity cell 12A . . . n as described below. When the tasks 22 of a thread 21 are completed, the task pool 13 may notify the CPU 11 of the completion. It is then the CPU's 11 responsibility to advance processing beyond the completed thread 21.

The cells 12A . . . n maintain solidarity with each other and with the CPU 11, in that the cells 12A . . . n are capable of helping the system 10 perform complex computations by autonomously and proactively seeking labor within the task pool 13. The cells 12A . . . n act autonomously in that they may act independently of the CPU 11 or any other co-processor. In particular, the cells 12A . . . n do not require an instruction from the CPU 11 to act. The cells 12A . . . n act proactively in that they seek a task 22 from the task pool 13 as soon as the cells 12A . . . n become available to do further processing. To acquire a task 22, a cell 12A sends an agent 30A to the task pool 13 to search for and retrieve an available task 22 that requires completion, is not locked, and has a task type that can be performed by the cell 12A. An agent 30A, B, C, D . . . n, hereinafter collectively referred to as agent 30A . . . n to indicate that the system 10 has the same number of agents as solidarity cells 12A . . . n, may be considered a data frame in the networking sense. It contains a source address, a destination address, and a payload. The source and destination addresses may serve two functions. First, the addresses guide transmission of the agent 30A . . . n. The destination address is the address of the task pool 13 when the agent 30A . . . n is seeking a task 22, and is the address of the corresponding cell 12A . . . n when the agent 30A . . . n is returning with a task 22. Correspondingly, the source address is the address of the cell 12A . . . n when the agent 30A . . . n is seeking a task 22, and is the address of the task pool 13 when the agent 30A . . . n is returning with a task 22. Second, the addresses may serve the purpose of frame synchronization. That is, the system 10 may include a method, such as those known in the art, to unequivocally differentiate addresses from payload data, so that when the contents of the agent 30A . . . n are read, the destination address indicates the beginning of the frame and the source address indicates the end of the frame, or vice versa. This allows the payload to vary in size when it is physically placed between the addresses. In another embodiment of a variable-size payload, the agent 30A . . . n may include a header that indicates the payload size. The header information may be compared to the payload to verify the data integrity. In still another embodiment, the payload may be a fixed length. When the agent 30A . . . n is dispatched to the task pool 13, the payload contains identifying information of the types of tasks the corresponding cell 12A . . . n can perform. When the agent 30A . . . n returns from the task pool 13, the payload contains the descriptor of the task 22, either in the form of a memory location or the full descriptor data structure.

The agents 30A . . . n are autonomous representatives of their corresponding solidarity cells 12A . . . n. That is, the agents 30A . . . n may be dispatched by their corresponding cells 12A . . . n to retrieve a task 22 any time the cell is idle or capable of performing additional processing. In this manner, the solidarity cells 12A . . . n are not forced to wait idly for an instruction from the CPU 11. This makes the system 10 more efficient than traditional computer architectures in which auxiliary modules and co-processors are dependent on instructions from the main CPU. Further, the solidarity cells 12A . . . n are not concerned about the composition of the thread 21 itself. An agent is only concerned about finding a match between the capabilities of its corresponding cell and the available tasks 22 to be completed in the task pool 13. As long as there are available tasks 22 in the task pool 13, and an available task 22 matches the capability of the cell, then the cell will always be working. The solidarity cells 12A . . . n may work fully independently of each other, or may communicate with each other directly, through the switching fabric 14, or through the task pool 13, to invoke another solidarity cell to post-process, move, or transmit data.

In one embodiment, the agent 30A may search for a match between the task type of the ready tasks 22 and the set of tasks that the cell 12A is able to perform. However, this architecture requires a particular hard-coding of the types of tasks that the CPU 11 will create. Thus, if the task pool 13 contains three types of tasks 22, and the large requirement include a task of a fourth type, this task may not be placed in the task pool 13 even if a cell capable of performing tasks of the fourth type is included in or added to the system 10. In this embodiment, the CPU 11 must be taught to create tasks of the fourth type in order to utilize all available resources in the system. In another embodiment, the agent 30A searches the task 22 descriptors for an executable instruction that matches one of the instructions that that cell 12A is capable of executing. When a matching task 22 is found, the agent 30A delivers the descriptor of the matching task 22 to the cell 12A, which begins to process the task 22. In the preferred embodiment, the agent 30A delivers the memory address of the descriptor, and the cell 12A retrieves the data structure from memory. Alternatively, where the descriptor's entire data structure is contained in the task 22, the agent 30A may deliver the complete data structure to the cell 12A for processing. The descriptor tells the cell 12A which instruction to execute, the location in memory units 15 of the data to be processed, and the location in memory units 15 for placing the results. Upon completion of the task 22, the cell 12A notifies the task pool 13 to change the status of the selected task 22 from 'to be completed' to 'completed.' Further, once the cell 12A finishes a task 22, it dispatches its agent 30A to the task pool 13 to seek another task 22.

Agents 30A . . . n travel through the system 10 by wire or wirelessly, such as by a wi-fi network or Bluetooth® pairing, according to the system 10 architecture. The agent 30A . . . n may reach the task pool 13 wirelessly provided that the task pool 13 includes a receptor and the solidarity cell 12A . . . n includes a transmitter. Similarly, the task pool 13 may answer wirelessly to the solidarity cells 12A . . . n provided that the task pool 13 includes a transmitter and the solidarity cell 12A . . . n includes a receiver. In this manner, it is conceivable to have a system 10 in which the cells 12A . . . n communicate wirelessly with the task pool 13 with or without the switching fabric 14. Preferably, however, a switching fabric 14 is used. The switching fabric 14 facilitates connections for data transfer and arbitration between all system 10 resources. The switching fabric 14 may be a router or crossbar switch that provides connectivity between each solidarity cell 12A . . . n and the task pool 13. The switching fabric 14 may further provide connectivity between each solidarity cell 12A . . . n and system resources such as the CPU 11, memory units 15, and traditional system components including, without limitation: direct memory access units, transmitters, hard disks and their controllers, display and other input/output devices, and other co-processors. The cells 12A . . . n may be connected physically to the switching fabric 14, or the cells 12A ... n may be connected wirelessly provided the cells 12A ... n and switching fabric 14 are equipped with transmitters and receivers as described above.

The wireless connection of cells 12A ... n into the system 10 allows the dynamic incorporation or removal of cells for use in the system 10. For example, the CPU 11 may recruit cells from other solidarity cell systems, allowing for dynamic expansion and increased performance. In this manner, two or more solidarity cell systems may share solidarity cells. In one embodiment, a solidarity cell that becomes idle may look for another system that has available processing tasks to be completed. Similarly, the system 10 may expand performance by incorporating clusters of additional cells for a particular task. For example, the system 10 increases performance of an encryption function by incorporating a nearby idle set of encryption-computation solidarity cells. In an alternative embodiment, the solidarity cells 12A ... n may connect directly to the task pool 13, such as by a wired configuration that does not require a switching fabric 14 to handle communications. The wired connection of cells 12A ... n may also allow for expansion and contraction of the system 10, although not as dynamically as with a wireless configuration because the system 10 components must be physically integrated or extracted. In either case, scalability of the system is greatly enhanced over conventional parallel processing schemes, as co-processors may be added and removed without reprogramming the CPU 11 to account for the changes to the system 10.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

I claim:

1. An apparatus for parallel processing of a large computing requirement, the apparatus comprising:
   a central processing unit ("CPU");
   a task pool in electronic communication with the CPU; and
   a first solidarity cell in electronic communication with the task pool, the first solidarity cell comprising a first agent configured to proactively retrieve, from the task pool, without requiring an instruction from the CPU, a matching task for the solidarity cell to process;
   wherein the CPU populates the task pool by dividing the requirement into one or more threads and placing the threads in the task pool, each thread comprising one or more tasks, and the matching task being one of the tasks;
   wherein each task comprises a descriptor, the descriptor containing at least:
      a function to be executed; and
      a memory location of data upon which the function is to be executed;
   wherein the first agent is a data frame comprising: a source address, a destination address and a payload;
   wherein the first agent retrieves the matching task by:
      being dispatched by the first solidarity cell to the task pool, during which the source address is the first solidarity cell's address, the destination address is the task pool's address, and the payload comprises a list of functions the first solidarity cell is configured to perform;
      searching the task pool for a task that is ready to be processed and has a function that the first solidarity cell can perform; and
      returning to the first solidarity cell, during which the source address is the task pool's address, the destination address is the first solidarity cell's address, and the payload comprises the descriptor of the matching task.

2. The apparatus of claim 1 wherein the task pool notifies the CPU when the tasks of a thread are completed.

3. The apparatus of claim 1 wherein the tasks each comprise a task type selected from a set of task types, and wherein the first solidarity cell is configured to perform tasks of one or more of the task types.

4. The apparatus of claim 3 wherein the matching task is a task that is ready to be processed and has a task type that the first solidarity cell can perform.

5. The apparatus of claim 4 wherein the first agent retrieves the matching task by:
   searching the task pool for a task that is ready to be processed and has a task type that the first solidarity cell can perform; and
   identifying the matching task.

6. The apparatus of claim 1 wherein the matching task is a task that is ready to be processed and the function of the matching task can be performed by the first solidarity cell.

7. The apparatus of claim 6 wherein the first agent retrieves the matching task by searching the task pool for a task that is ready to be processed and has a function that the first solidarity cell can perform, and identifying the matching task.

8. The apparatus of claim 1 wherein the descriptor further contains a memory location where processed data is to be stored.

9. The apparatus of claim 1 wherein the descriptor is a data structure and the task contains a reference to the memory location of the descriptor.

10. The apparatus of claim 1 wherein the task pool occupies a region of physical memory.

11. The apparatus of claim 10 wherein the task pool is disposed in a hardware block dedicated to the task pool.

12. The apparatus of claim 1 further comprising a second solidarity cell comprising a second agent that proactively retrieves matching tasks from the task pool for the second solidarity cell to process, wherein the matching task for each solidarity cell is a task in the task pool that is ready to be processed and can be performed by the solidarity cell.

13. The apparatus of claim 12 wherein each solidarity cell sends its agent to the task pool when the solidarity cell does not have a matching task to process.

14. An apparatus for parallel processing of a large computing requirement, the apparatus comprising:
   a central processing unit ("CPU");
   a task pool in electronic communication with the CPU;
   first solidarity cell in electronic communication with the task pool, the first solidarity cell comprising a first agent configured to proactively retrieve, from the task pool, a matching task for the solidarity cell to process; and
   a second solidarity cell comprising a second agent that proactively retrieves matching tasks from the task pool for the second solidarity cell to process, wherein the matching task for each solidarity cell is a task in the task pool that is ready to be processed and can be performed by the solidarity cell;
      wherein each solidarity cell sends its agent to the task pool when the solidarity cell does not have a matching task to process; and wherein each agent comprises a source address, a destination address, and a payload, and wherein each agent retrieves a matching task by:
- being dispatched by its solidarity cell to the task pool, during which the source address is its solidarity cell's address, the destination address is the task pool's address, and the payload comprises a list of functions the agent's solidarity cell is configured to perform;
- searching the task pool for a task that is ready to be processed and has a function that the agent's solidarity cell can perform; and
- returning to its solidarity cell, during which the source address is the task pool's address, the destination address is the agent's solidarity cell's address, and the payload comprises a descriptor of the matching task.

* * * * *